(12) United States Patent
Skeba et al.

(10) Patent No.: US 9,462,436 B2
(45) Date of Patent: Oct. 4, 2016

(54) PREVENTING DROPPED CALLS THROUGH BEHAVIOR PREDICTION

(71) Applicant: Intel Corporation, Santa Clara, CA (US)

(72) Inventors: Kirk W Skeba, Fremont, CA (US); Jaroslaw J Sydir, San Jose, CA (US); Anthony G LaMarca, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 230 days.

(21) Appl. No.: 13/721,776

(22) Filed: Dec. 20, 2012

(65) Prior Publication Data

US 2014/0179279 A1     Jun. 26, 2014

(51) Int. Cl.
*H04W 24/00* (2009.01)
*H04W 4/16* (2009.01)
*G06F 3/048* (2013.01)
*H04W 4/02* (2009.01)
*G01C 21/34* (2006.01)

(52) U.S. Cl.
CPC ............... *H04W 4/16* (2013.01); *G06F 3/048* (2013.01); *G01C 21/34* (2013.01); *H04W 4/025* (2013.01)

(58) Field of Classification Search
CPC ............................... H04W 4/16; H04W 4/025
USPC ............... 455/456.1, 456.2, 456.3, 436, 421
See application file for complete search history.

(56) References Cited

U.S. PATENT DOCUMENTS

| | | | |
|---|---|---|---|
| 7,855,977 B2 | 12/2010 | Morrison et al. | |
| 8,023,964 B2 * | 9/2011 | Hadinata et al. | 455/456.1 |
| 8,295,838 B2 * | 10/2012 | Abdel-Kader | H04W 4/02 455/436 |
| 8,559,972 B2 * | 10/2013 | Shaffer et al. | 455/456.1 |
| 2012/0157089 A1 | 6/2012 | Yang et al. | |

FOREIGN PATENT DOCUMENTS

WO     2014/098986 A     6/2014

OTHER PUBLICATIONS

International Preliminary Report on Patentability and Written Opinion Received for PCT Patent Application No. PCT/US2013/046677, mailed on Jul. 2, 2015, 9 pages.
International Search Report and Written Opinion received for PCT Patent Application No. PCT/US2013/046677, mailed on Sep. 24, 2013, 10 pages.

* cited by examiner

*Primary Examiner* — Charles Appiah
*Assistant Examiner* — Randy Peaches
(74) *Attorney, Agent, or Firm* — Forefront IP Lawgroup, PLLC

(57) ABSTRACT

Described herein are techniques related to preventing dropped cellular phone calls through predicting the behavior of cell phones along a route traveled by a mobile device. This Abstract is submitted with the understanding that it will not be used to interpret or limit the scope and meaning of the claims.

37 Claims, 11 Drawing Sheets

PREVENTING DROPPED CALLS THROUGH BEHAVIOR PREDICTION

BACKGROUND

The use of mobile devices, such as smartphones, is nearly ubiquitous. Many of these mobile devices include the capability to determine their physical location. That is, the mobile device is capable of determining its location in the physical world. Conventionally location determination is typically accomplished by using Global Positioning Systems (GPS), some form of trilateration or interpolation of multiple radio signals, internet protocol (IP) geo-location, or some combination thereof.

A collection of so-called location-based services (LBS) are emerging that take advantage of the location-detection capability of the mobile devices that so many people are carrying with them each day. For example, LBSs include targeted advertising, social networking, locating friends ("check-ins"), photo tagging, life logging, location-based games, fitness monitoring, and others. Location-based services may include vehicle or parcel tracking as well.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Figure 1:
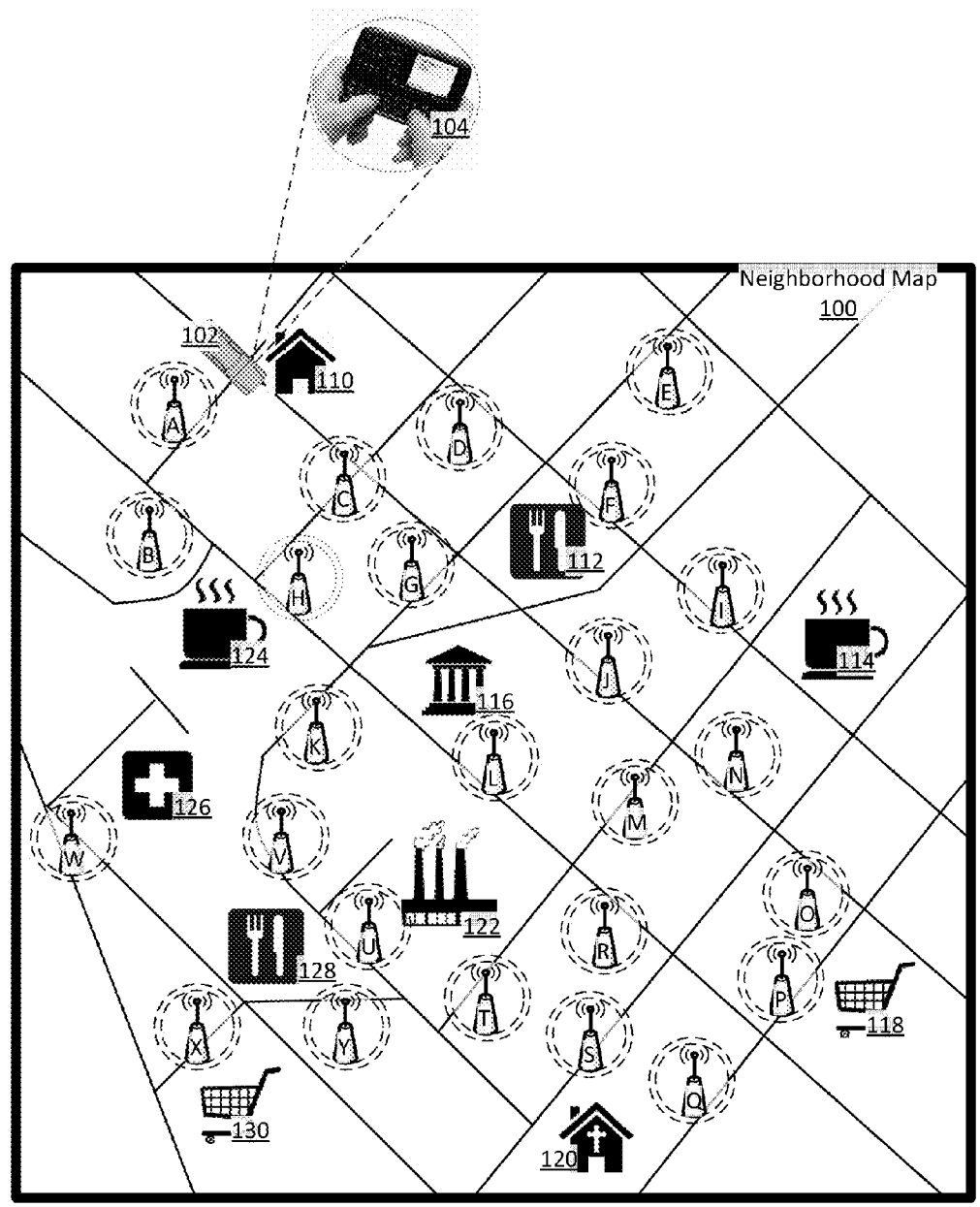
FIG. 1 shows an example neighborhood map that is used to illustrate implementations in accordance with the description herein.

Even in this age of pervasive cellular-phone service coverage and universal usage of cell phones, it is still the case that cellular phone calls often drop in the same place or at a specific time and place with regularity.

Disclosed herein are technologies for estimating a route being traveled by a mobile device, such as a cellular phone, based upon detection of an array of ambient identifiable wireless signal (IWS) sources while the device is traveling. Disclosed herein also are technologies for predicting where cellular-phone service coverage holes exist along the route being traveled by the mobile device based upon past behavior of the mobile device and a history of dropped calls along the route. The history can be established using crowd-sourced information and/or information from the mobile device itself. Information is often called crowd-sourced when it is gathered from a large group or "crowd" of users.

In one or more implementations, the mobile device assists in determining when a user should be concerned about an impending call failure.

Cellular calls are dropped for many reasons. Some calls are dropped because of congestion in the network. Other calls are dropped when exiting the coverage area. Still other calls are dropped because of poor signal strength and or because of strong interference. The locations where dropped calls occur consistently can be called "coverage holes" or "dead spots."

In one or more implementations described herein, a mobile device models and tracks the places that a user commonly visits and the paths the user takes between these places. For instance, the mobile device is able to identify when calls are dropped, remember the locations, continue to monitor the locations over time to identify a consistent pattern of failure, and then alert or redirect the user should the mobile device determine that it is heading toward a bad area while needing connectivity.

Modeling and tracking is done in a power-efficient way using the results of periodic (approximately once per minute, for example) Wi-Fi scans. The result of this technique is a graph-based model of a user's patterns in which nodes and edges denote the places and routes between them. The places and routes are learned and later recognized based on the SSID and BSSIDs of the 802.11 Wireless Access Points (WAPs) observed during the WiFi scans. Data shows that when residing at or travelling to known places, implementations accurately predict the user's state 95% of the time.

The herein described drop-called prediction system can make use of crowd sourcing to learn/verify bad coverage spots. When a device is in an area never before visited it can query the crowd-sourced database about potential points of poor coverage in the area. When a device has learned a poor coverage spot it can collaborate with others by contributing information about the location of the poor coverage spot to the database. Within the database, reports of poor coverage areas from individual users can be compared across reports from other users in a private manner to determine if the poor coverage spot was seen by other users and determine if it is related to interference or poor coverage and not to a network load or congestion problem.

Because the technology described herein incorporates a learning element, it can adjust a rating of the call-drop potential as the network and coverage changes. In one or more implementations, the technology described herein logs a location where a call is dropped and remembers it for future reference. In addition each time the same spot is approached, the route is monitored to determine whether the problem is persistent and needs to be included in a warning or whether the problem has been resolved. Because of continual learning and updating of the model, the technology takes into account the changes or improvements a cellular phone system operator may have made to the area.

One or more implementations of technology described herein also facilitates accurate prediction of what the user's likely destinations are and when they are likely to arrive at those destinations. Being able to accurately predict route, destination, and estimated-time-of-arrival (ETA) has a several applications. These applications include accurate prediction of destination and arrival time, which allows for smarter budgeting of limited resources (e.g. battery or network data limits). Applications also include accurate route information, which enables prediction of network resources likely to be encountered on route (e.g. areas of underutilized so-called 4G radio for cloud/client synchronization). Also, route/destination/ETA info has direct use in social networking for keeping people aware of the activities of friends and family.

Moreover, after determining a route along which the mobile device is traveling, the technology herein determines whether the route that the mobile device is traveling along is a known route. If the route is a known route, the technology described herein predicts whether there are one or more coverage holes that have been learned based on a past history of dropped cellular phone calls along the known route. If there are one or more coverage holes predicted to be located along the known route, the technology described herein generates a coverage-hole notification indicating that there are one or more coverage holes along the route.

While it is not possible to predict all dropped calls on cellular handsets, the technology described herein can identify potential call drop areas before they happen again. This is accomplished by knowing the routes that a user follows, learning the user's past behavior from those routes and combining these with prior history of any outages to alert the user when they are approaching a coverage hole.

The technology described herein also keeps a history of the coverage holes and retests them for accuracy when passing through the area again. Over time the mobile device can predict the probability that a call will be dropped on a given route or on a given segment of a route. The mobile device can then provide a warning either during the trip, or some amount of time before reaching the location where the cellular call is likely to be dropped.

Location Awareness

Location awareness involves the mobile device determining its present location. Conventional location-determination approaches include GPS and signal positioning (e.g., triangulation, trilateration, and other forms of interpolation and extrapolation) to determine geo-physical location relative to multiple signal sources. GPSs are near-ubiquitous outdoor location technology and a GPS enabled typical smartphone has three to five meter accuracy. For signal positioning, the signal sources can use cellular or a variant of IEEE 802.11 (i.e., Wi-Fi). Signal-positioning approaches rely upon a map of signal sources whose locations are known to extrapolate a location of a device.

However, GPS technology is resource intensive and limited to outdoor use. In particular, GPS technology is computationally demanding and power hungry. Most users have learned to use their GPS sparingly when their mobile device is battery dependent. Otherwise, the GPS quickly drains the battery of their mobile device. In addition, GPS technology is dependent upon reception of signals from geosynchronous satellites. Indoors as well as on city streets with surrounding tall buildings, it is common for a mobile device to fail to receive sufficient signals to make reliable GPS calculations.

Conventional approaches rely upon determination of physical or geophysical location to estimate route, predict destination, and calculate estimated time of arrival ("ETA"). Unlike those conventional approaches, one or more implementations of the technology described herein learn and recognize a user frequently used routes based upon the "observed" ambient radio environment along the routes.

One or more implementations described herein include, for example, a mobile device recognizing and learning a frequented discrete location based on the "observed" ambient radio environment at that location. In particular, the mobile device can recognize and learn which ambient identifiable wireless ("IWS") sources are part of a topography within reception range at that discrete location.

A wireless access point (WAP) is a specific example of an ambient IWS source. The IWS sources are called ambient herein because they may be detected or "observed" in the environment while a mobile device moves about the world. The IWS sources are called "identifiable" because each is uniquely identifiable. For example, each WAP may be uniquely identified by its basic service set identification (BSSID) or media access card (MAC) address. Of course, other identifying characteristics may be used alone or in combination with each other or with the BSSID or MAC address. Examples of such other identifying characteristics include service set identification (SSID) and received signal strength indication (RSSI).

Geo-location, also called geo-physical location, includes determination of a real-world geographic location of an object or person. "Physical location" is a broader term than geo-location and includes a determination of any real-world location of the object or person.

Example Scenario

FIG. 1 includes an example neighborhood map 100 that will be used to illustrate example scenarios in which one or more implementations of the technology described here may be employed. For illustration purpose, the map 100 shows an automobile 102 on a road that has a driver or passenger (not shown) with an active mobile device 104. While the mobile device 104 is active, a user does not need to interact with it. Indeed, if that user is the driver of the automobile, such action is generally unsafe. Indeed, with implementations described herein, the mobile device 104 may be programmed to automatically send messages at designated points along a route. For example, a text message may be automatically sent when the driver is five minutes away from his destination. This helps a driver avoid potentially dangerous distractions by manually inputting such a text message while driving.

The map 100 also shows several points of interest (POIs), which may be known or determined start points or end points (i.e., destination) of a route traveled by user with the mobile device 104. The POIs depicted in FIG. 1 include a home 110, a diner 112, a café 114 (i.e., coffee shop), a school 119, a grocery store 118, a church 120, a factory 122 (i.e., work), another café 124, a doctor's office 129, a restaurant 128, and a shopping center 130.

Also, the map 100 shows many wireless access points (WAPs) distributed about the neighborhood. Each WAP is labeled with a capital letter ranging from A to Y. A dashed double-lined circle indicates the range of each depicted WAP. While not shown as such in map 100, each POI depicted in FIG. 1 also contains one or more WAPs.

The WAP is a specific example of an ambient identifiable wireless signal (IWS) source. The IWS sources are called ambient herein because they may be detected or "observed" in the environment while the mobile device 104 travels along a path on one or more of the streets, as shown on the map 100.

The IWS sources are called "identifiable" because each is uniquely identifiable. For example, each WAP may be uniquely identified by its basic service set identification (BSSID) or media access card (MAC) address. Of course, other identifying characteristics may be used alone or in combination with each other or with the BSSID or MAC address. Examples of such other identifying characteristics include service set identification (SSID) and received signal strength indication (RSSI).

In addition, once the IWS source is uniquely identified by a mobile device, an implementation may assign a unique identifier (ID) for convenience of handling. For example, the IWS source at a person's home may be labeled "Home," as is shown at 110 in the map 100.

With at least one implementation, a list of ambient IWS sources is tracked when the mobile device 104 is active. Of course, when the user is stationary, the ambient IWS source does not change or at least varies little. But, when the user travels (with the mobile device 104) new IWS sources are noted along the travel path. For example, the user may be walking, running, in a motor vehicle, train, or some via some other sort of ground transport.

For example, with reference to map 100, presume that Dorothy spends eight hours at work 122. During the workday, the mobile device 104 records one or more IWS sources that have been or will be designated "Work." After her workday, she drives to the shopping center 130 in her automobile 102. While traveling from work 122 to the store 118, her mobile device 104 encounters IWS sources labeled U, T, R, and P. After she takes this path many times, the pattern of Work, U, T, R, and P and Store will reoccur frequently. At that point, that pattern may be recognized route and identified. For convenience, that route is called Work→Store here. The naming convention follows the pattern of source, arrow, and then destination. The arrow indicates the directional nature of the routes. Of course, because other paths between work 122 and the store 118 exist, other routes may have the same label (Work→Store). For example, Work→Store may include Work, T, M, N, O, Store.

Instead of determining and tracking physical or geophysical locations like as are depicted on a map, the technology described herein tracks discrete places, which are the ambient IWSs encountered, and determines a route based, at least in part, upon an ordered pattern of such discrete places.

Figure 2:
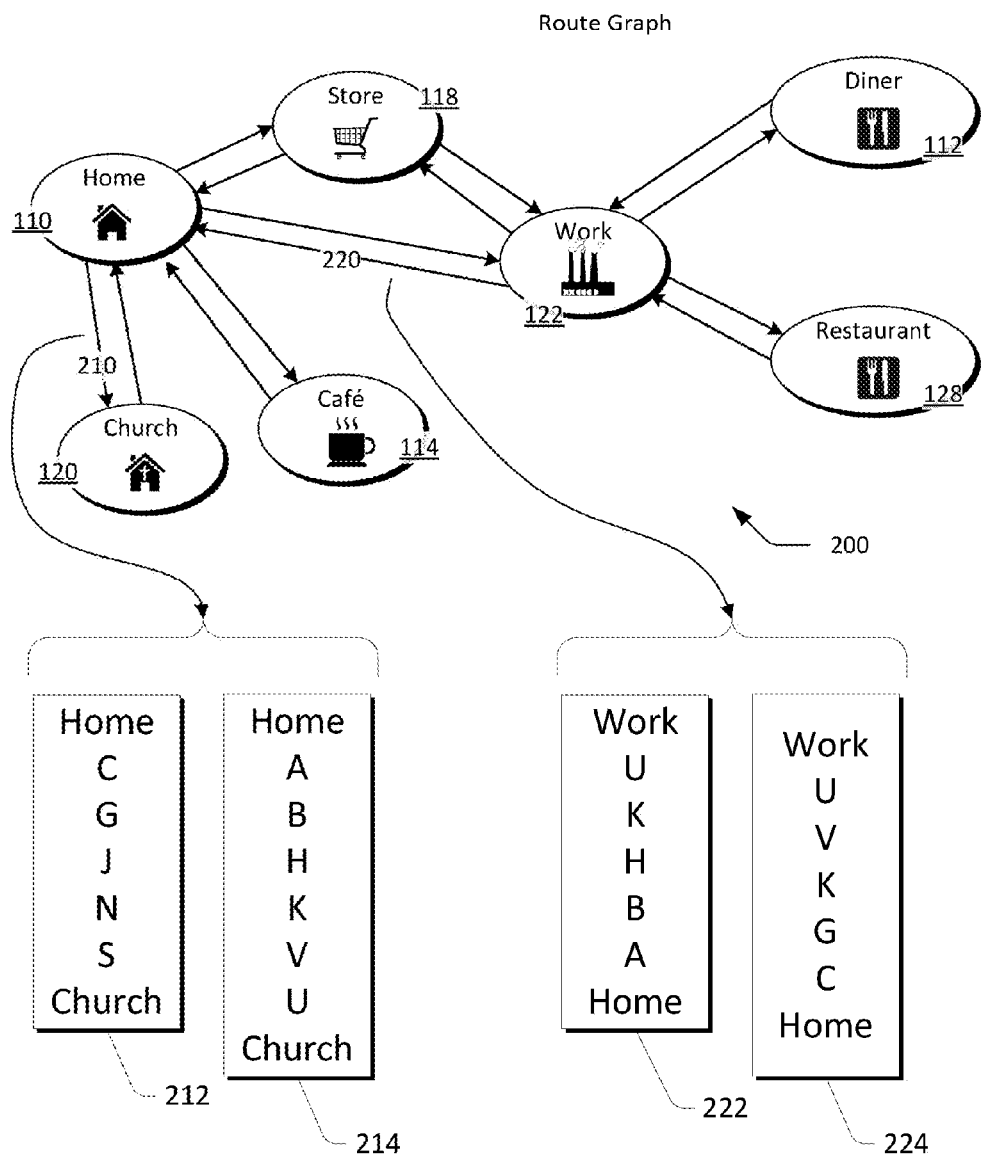
FIG. 2 shows an example route graph that is used to illustrate implementations in accordance with the description herein.

FIG. 2 shows a route graph 200, which is a logical depiction of some example routes that Dorothy has taken with her mobile device 104. Logically, Dorothy's places and routes can be viewed as a graph with connections between places that have been traveled between directly. The graph 200 includes example sources (i.e., start points) and destinations (i.e., end points) of the example routes. Those example sources/destinations are selected from those depicted in the map 100. The selected example sources/destinations include home 110, church 120, store 118, café 114, work 122, diner 112, and restaurant 128.

In the route graph 200, the arrows indicate the route and direction of the route between points. For Home→Church route 210, the mobile device 104 has, for example, recorded at least two different paths, as represented by route datasets 212 and 214, respectively. Route dataset 212 includes Home, C, G, J, N, S, and Church. Route dataset 214 includes Home, A, B, H, K, V, U, and Church. For Work→Home route 220, the mobile device has, for example, recorded at least two different paths, as represented by route datasets 222 and 224, respectively. Route dataset 222 includes Work, U, K, H, B, A, and Home. Route dataset 224 includes Work, U, V, K, G, C, and Home.

The depicted route datasets are one possible implementation. Other implementations, like those described herein, may be more complex. In those implementations, each given route (e.g., route of Work→Home) has one dataset that tracks all ambient IWS sources encountered each time trip from that start point to that destination is taken. Also, other information (such as timing) may be tracked in the route dataset as well.

At any given time, Dorothy is either in a single place or is en route to a new place. Since routes overlap in the physical world and since routes pass near places she might stop, it is often not possible to predict Dorothy's state as a singular route or place. For example, when Dorothy drives out of work 122, she may be going home 110, to a café 124, or possibly to the school 119 to pick up the kids. Since all three places lay along the same path, it may be hard to determine which path you are on solely from the environment. Even a passenger in the automobile 102 with Dorothy is likely unable to determine her destination using the environment alone.

Therefore, the implementations described herein consider all of the three places as possible destinations. Further, consider that Dorothy may encounter a red traffic light on the same corner as the café 124. For the sixty seconds that Dorothy waits for the light to continue on home 110, implementations will take into consideration that Dorothy has, in fact, stopped for coffee. To accommodate this, the implementations predict the user's state as being in at most one single place (e.g., café 124) and/or traveling one of a set of possible routes. (e.g. {'Work->Home', 'Work->Store, 'Work->café}).

To reduce the power consumption, the technology may scan for ambient IWS sources infrequently. Perhaps, three times per minute is a reasonable compromise for accurate route estimation and reduced power consumption. Of course, scans can occur more frequently or less so.

The technology described herein may utilize any new or existing place-recognition technology that learns and recognizes when a user is visiting a particular place. For example, the technology may be linked to a workplace security system and note that the user is located at work 122 because she has scanned her identification badge to gain entry into the work buildings. Otherwise, via data entry, a user may simply identify a IWS source or a collection of such sources with a name, such as "work."

Example System

Figure 3:
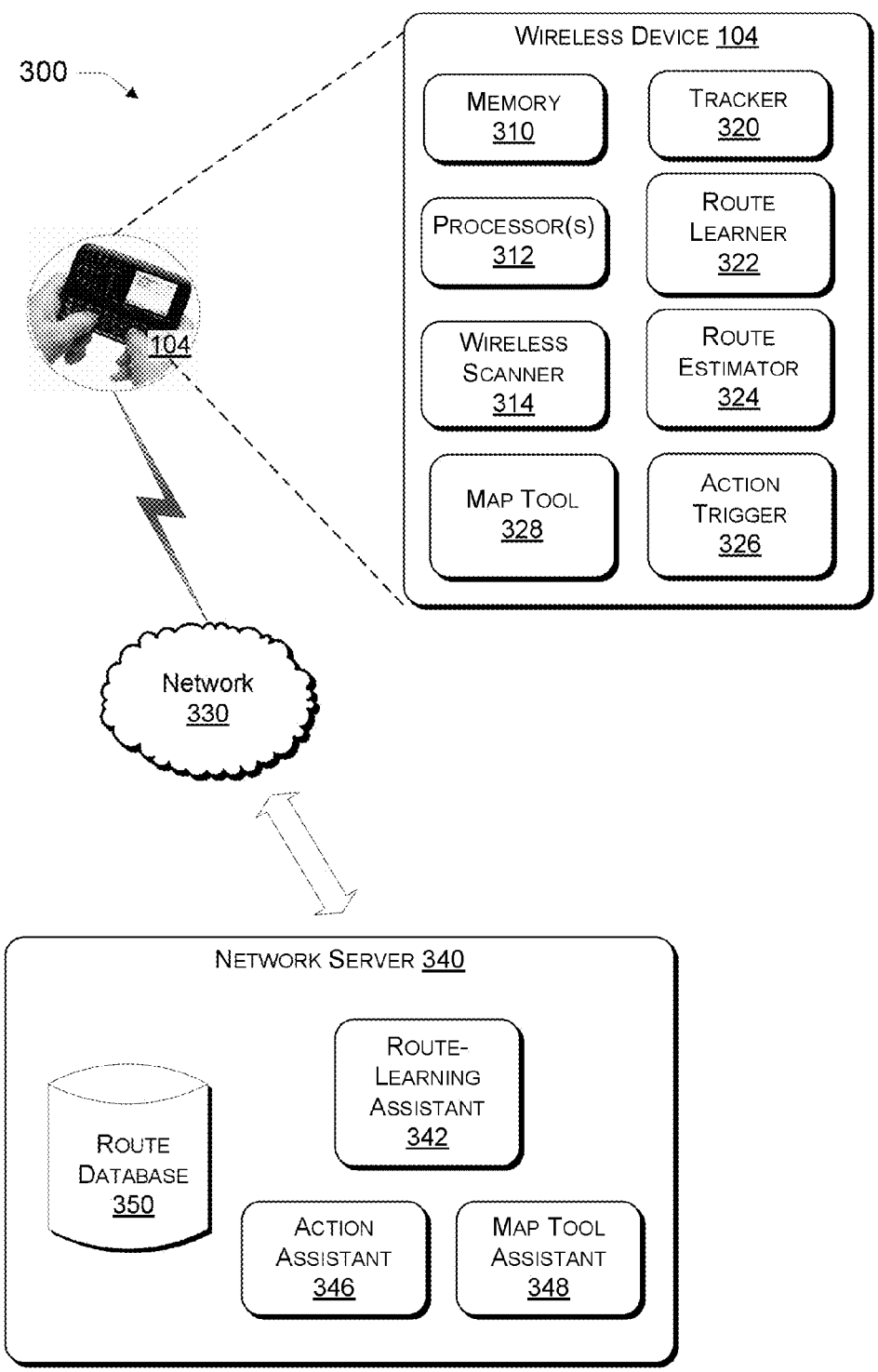
FIG. 3 illustrates an example system in accordance with one or more implementations described herein.

FIG. 3 illustrates example system 300 for implementing the technology described herein. The system 300 includes the mobile device 104, a network 330, and a network server 340.

The mobile device 104 includes a memory 310, one or more processor(s) 312, a wireless scanner 314, a tracker 320, a route learner 322, a route estimator 324, an action trigger 329, and a map tool 328. These functional components may be separate or some combination of hardware units. Alternatively, the components may be implemented, at least in part, in software and thus be stored in the memory 310 and executed by the processors 312.

The memory 310 may include its own local route database (akin to the to-be-described route database 350). The local route database on the mobile device 104 stores the routes that have been learned by the device and the tracker 320 uses those route definitions in performing its tracking.

The wireless scanner 314 periodically scans for ambient IWS sources. The tracker 320 helps identify the encountered ambient IWS sources and store them in the memory 310. Using a stream of encountered ambient IWS sources, the route learner 322 finds reoccurring patterns and learns routes. Based upon historical routes, the route estimator 324 estimates the current route and/or destination. Based upon that estimate, the route estimator 324 may also calculate an estimate time of arrive (ETA).

The action trigger 329 performs or triggers the performance of a predetermined action based, at least in part, upon the route estimated or calculated ETA. For example, an automated text may be sent to another person when the mobile device 104 is located just a few minutes for the destination. A trigger for the action is often based, at least in part, upon the present ambient IWS source that the device 104 encounters while traveling.

Using a user interface (UI) on the device 104, a user may configure a triggering action using a configuration part of the action trigger 329. An action is defined to include the trigger (e.g., three minutes from a particular destination), automatic actions to be performed (e.g., sending a text message), and objects of such action (e.g., recipient of such a text message). Examples of other actions include sending an email, launching an application or program, enable a system function, or other so-called geo-fencing actions.

The map tool 328 may provide knowledge of geo-location of places (e.g., specific ambient IWS sources). Such knowledge may involve a database of WAP geo-locations. The map tool 328 may determine the geo-location of a logical place after the place has been recognized as a place and added to the model (e.g., route graph 200).

The network 330 may be a wired and/or wireless network. It may include the Internet infrastructure and it may be presented as the so-called "cloud." The network 330 may include wired or wireless local area network, a cellular network, and/or the like. The network 330 links the mobile device 104 with the network server 340.

The network server 340 provides assistance to the mobile device 104 as part of one or more implementations of the technology described herein. In some implementations, the network 330 and network server 340 are not utilized. That is, the mobile device 104 performs the implementations described herein without assistance of the network 330 or network server 340. The network server 340 may be one or more actual servers.

The network server 340 includes a route-learning assistant 342, a route estimator assistant 344, an action assistant 349, a map tool assistant 348, and a route database 350. The route-learning assistant 342 may help the route learner 322 learn routes. This may be accomplished by off-loading data processing and data-transfer to off-peak times. For example, the most recent tracking data may be uploaded at night for data processing and reporting overnight.

Using a user interface (UI), a user may configure a triggering action via the action assistant 349. The action assistant 349 may be implemented, at least in part, as a website where a user may select triggers (e.g., three minutes from a particular destination), automatic actions to be performed (e.g., sending a text message), and objects of such action (e.g., recipient of such a text message).

The map tool assistant 348 may provide knowledge of geo-location of places (e.g., specific ambient IWS sources). Such knowledge may involve a database of WAP geo-locations. The map tool assistant 348 may determine the geo-location of a logical place after the place has been recognized as a place and added to the model (e.g., route graph 200). The consultation of the WAP database can occur at a time that is convenient to the mobile device 104. For example, it may happen at home, connected to free Wi-Fi connection and when charging. Also, the consultation might only need to occur once for each place.

The route database 350 stores a collection of route datasets collected from the mobile device 104 and other networked mobile devices. The route database 350 of a server may contain routes from various devices. That is, the route database 350 may be, at least in part, crowd-sourced. Based upon this collection of route datasets, the route-learning assistant 342 helps individual devices learn new, unknown, unrecognized, or incomplete routes. The database 350 may be consulted for cross-referencing ambient IWS sources and routes traveled by various mobile devices.

Figure 4:
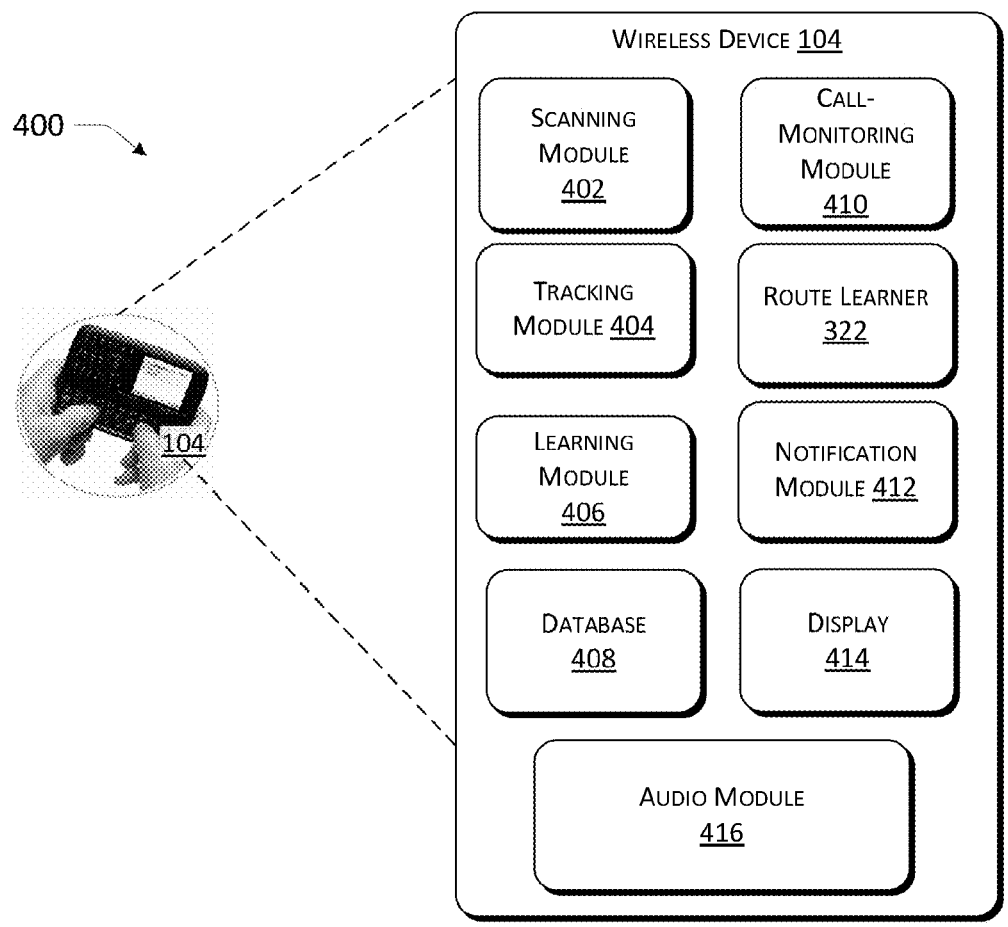
FIG. 4 illustrates an example mobile device in accordance with one or more implementations described herein.

FIG. 4 illustrates an alternative example mobile device 104 for implementing the technology described herein. The example mobile device 104 includes a scanning module 402, a tracking module 404, a learning module 406, a database 408, a call-monitoring module 410, a notification module 412, a display 414, and an audio module 416.

In one or more implementations, the scanning module 402 encounters a series of ambient IWS sources while the mobile device 104 is traveling along a route.

The illustrated tracking module 404 tracks the encountered series of ambient IWS sources along the route taken by the mobile device 104.

The illustrated learning module 406 learns the route taken by the mobile device 104. This is in response to tracking of the encountered series of ambient IWS sources. The learning module 406 also determines whether the route taken by the mobile device 104 includes any dropped calls, caused by coverage holes, for example. The learning module 408 also correlates the history of dropped calls with coverage holes.

The database 408 is configured to store the learned routes. The database 410 also stores a history of calls that were dropped along the routes.

The call-monitoring module 410 monitors routes along which the mobile device is traveling. The call-monitoring module 410 also compares the route along which the mobile device 104 is traveling to the learned routes that are stored in the database 408. The call-monitoring module 410 also compares the route along which the mobile device 104 is traveling to the history of dropped calls along the route. The call monitoring module 410 also monitors the calls made by the user to determine whether a dropped call has occurred. When a dropped call has occurred the call monitoring module 410 notifies the learning module 406 of the location at which the dropped call has occurred.

The illustrated notification module 412 generates a coverage-hole notification if the comparison of the route along which the mobile device 104 is traveling matches a stored, learned route that has a history of dropped calls.

In one or more implementations, the notification module 412 plays an audible sound indicating that the route that the mobile device 104 is traveling along has a history of dropped calls. In an alternative implementation, the notification module 412 displays a text message indicating that the route that the mobile device 104 is traveling along has a history of dropped calls. In still another alternative implementation, the notification module 412 displays a predetermined text message. The predetermined text message indicates that the route that the mobile device 104 is traveling along has a history of dropped calls and that the mobile device 104 should take an alternative route.

In various implementations, the display 414 may include any display, such as a touch screen display, a holographic display, etc., that is capable of displaying text, images, and the like.

In various implementations, the audio module 416 may include any audio system that is capable of playing and/or recording audible sounds. For example, the audio module 416 includes one or more speakers (not shown) and one or more microphones (not shown).

As depicted and discussed, the mobile device 104 is a mobile phone. However, the mobile device 104 may be another type of portable device, such as a smartphone, cell phone, tablet computer, any wireless-enabled wearable device, laptop computer, netbook computer, or the like.

Route-Learning Operation

Figure 5:
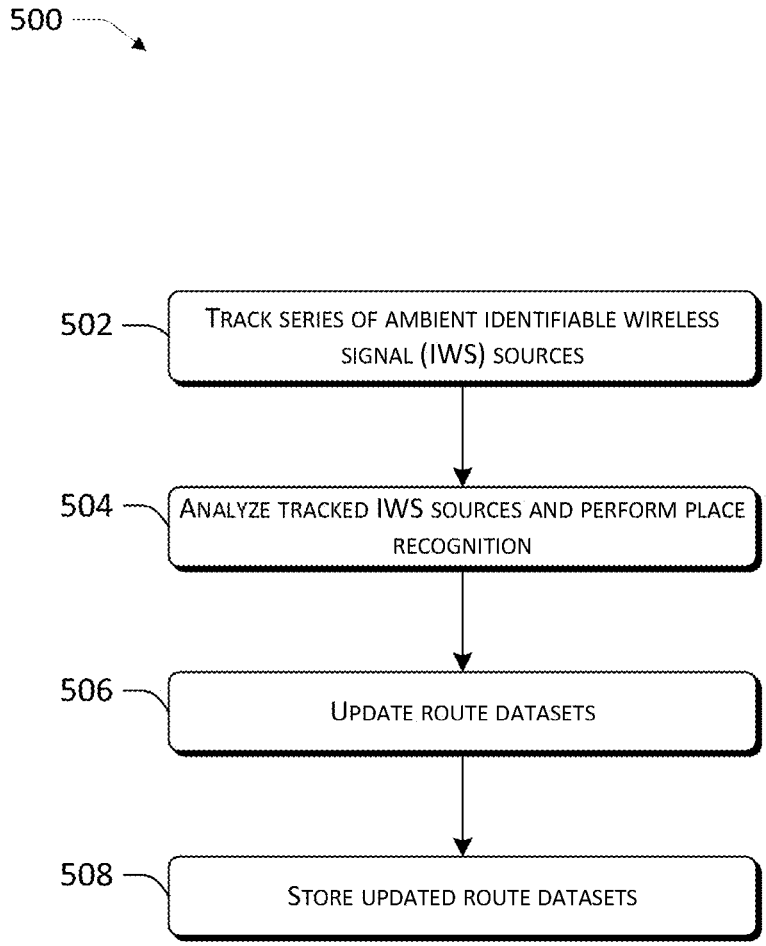
FIGS. 5-9 illustrate processes in accordance with implementations described herein.

FIG. 5 illustrates an example process 500 for implementing, at least in part, the technology described herein. In particular, process 500 depicts a route-learning operation of the mobile device 104.

At 502, the mobile device 104 encounters a series of ambient IWS sources. Using its wireless scanner 314, the mobile device 104 periodically scans for ambient IWS sources. The tracker 320 detects, identifies, and records encountered ambient IWS sources.

Each detected and identified ambient IWS source is tracked as part of a series of such sources. If the series has differing ambient IWS sources, then the mobile device 104 is traveling. That is, the Wi-Fi signals may be called "unstable." The pattern of differing ambient IWS sources may be a route. As used herein, a route has a start and end place as well as a set of ambient IWS sources that have been previously encountered along the route. Examples of such routes are illustrated in route datasets 212, 214, 222, and 224.

In one or more implementations, the information for a route between places <start> and <end> with IWS identification ($IWSID_1$) seen at the beginning and $IWSID_2$ seen in the middle would be represented by the example format of the route dataset:

$$R_{start \to end} = (P_{start}, P_{end}, N \text{ trips}, T, \{(IWSID_1, X_1, P_1), (IWSID_2, X_2, P_2) \ldots \})$$

where N is the number of trips, T is the average time of the trips, $X_i$ is the number of trip that $IWSID_i$ was encountered, and $P_i$ is the percentage of the route that has been traversed when $IWSID_i$ is observed.

At 504, the route learner 322 analyzes the series of encountered ambient IWS sources (e.g., $w_1, w_2, w_3, \ldots w_n$) to determine place recognition. The route learner 322 performs place recognition to designate a single IWS source or a collection of sources as a place. For example, a place may be designated "home" or "work" or some other unique label. It then removes the sequence of IWS observations that represent the place visit and replaces them in the series with a token to represent the time spent at the place. For example, consider the IWS subsequence . . . $w_4, w_3, w_9, w_9, w_9, w_9, w_9, w_3$ . . . . If place $P_{27}$ was known to contain IWS $w_9$ the place recognizer would recognize the series of observations of $w_9$ as a visit to place $P_{27}$. Accordingly the route learners substitutes the series of IWS observations (in this case) with the token '$P_{27}$' and as a result the subsequence becomes: . . . $w_4, w_3, P_{27}, w_3$ . . . . In this way, the full series of IWS observations is reduces to subsequences of IWS observations that represent periods of movement, bracketed by token representing the place where the movement started and where it ended. For a particular implementation, a segment of the series that corresponds to place visits is replaced with tokens representing the place:

$$(P_0, w_{i+1}, w_{i+2}, w_{i+3}w, \ldots, P_1, w_{j+1}, w_{j+2}, w_{j+3}, \ldots, P_2 \ldots)$$

where $P_0$, $P_1$, and $P_2$ are place tokens.

The remaining segments of series represent the times when routes were travelled and the place tokens before and after the segments are the start and end of the trip.

At 506, the route learner 322 updates the route datasets. For each segment of the series of tracked IWS sources between, for example, places a and b, the route learner 322 does the following:

If the route $R_{a \to b}$ does not exist, create it. That is, if no route dataset exists for the route between a and b, then generate a new route dataset.

Otherwise, if that route does exists, then update that route dataset by incrementing the number of trips and adjusting the average trip time based on trip count and the latest traversal time using the first and last Wi-Fi scan time in the segment.

For each observed IWSID in the segment: add the IWSID to the set for $R_{a \to b}$ dataset if it is not already included and update the count and weighted percentage based on its first observation in the segment.

At 508, the results of the update are stored in the memory 310 of the mobile device. Such results may be uploaded via the network 330 to the network server 340.

This route-learning process 500 is incremental and can be run occasionally (e.g., nightly) to keep the route database up to date. In addition, timing information about the route is tracked and stored in association with the route datasets. For example, the mobile device 104 tracks how many times the route has been traveled and the average time the trips have taken. To allow progress within a route to be estimated, the mobile device 104 tracks how many times each IWSID has been observed on the route and what fraction of the way (in time) it was observed.

Route-Estimation Operation

Figure 6:
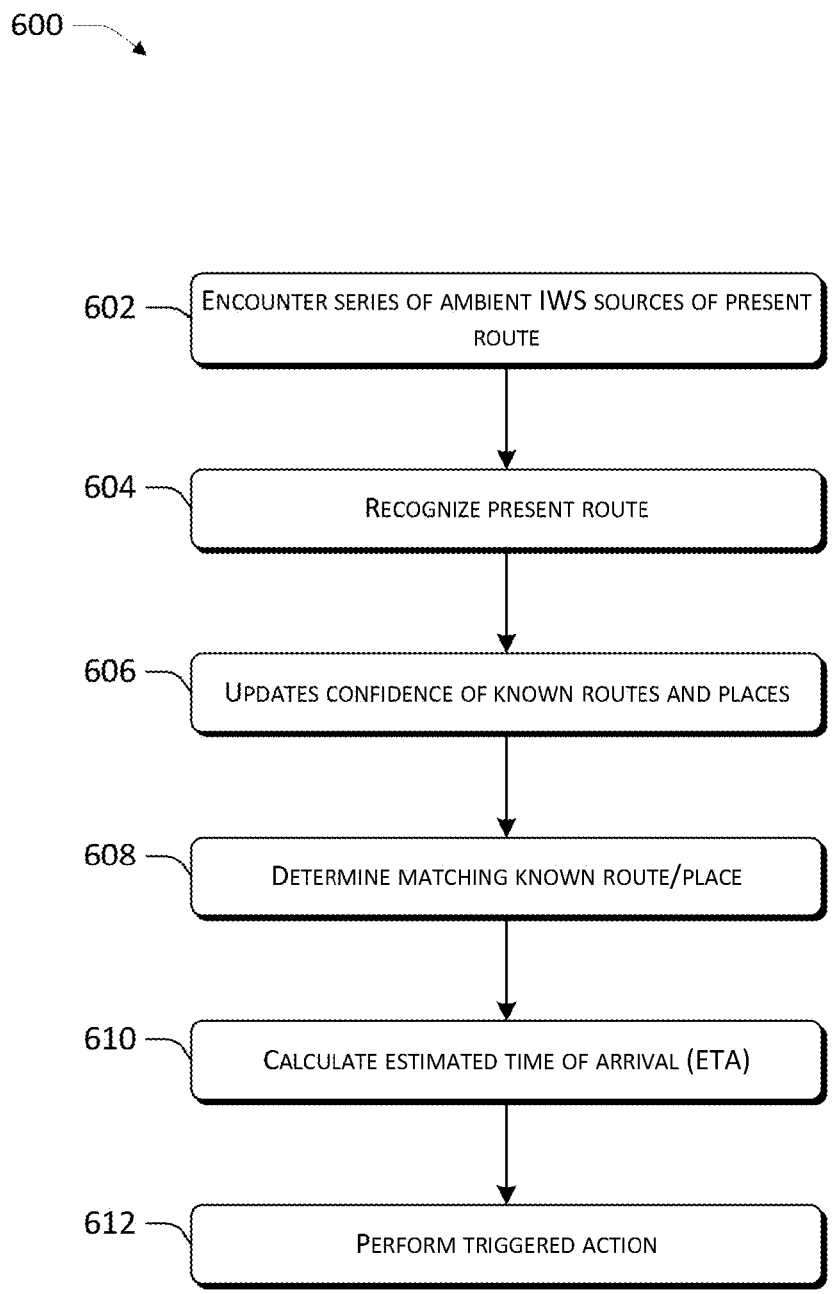

FIG. 6 illustrates an example process 600 for implementing, at least in part, the technology described herein. In particular, process 600 depicts a route-estimation operation of the mobile device 104. This process 600 may be operating at all times and thus maintains an estimate of the user's location or route at all times.

The process 600 is evidence-based using each Wi-Fi scan to either increase or decrease its confidence in each place and/or route in the user's location model (e.g., route graph 200). The user's state is a combination of places and routes whose confidence level exceeds a threshold and thus represent the most likely location of the user.

At 602, the mobile device 104 encounters a series of ambient IWS sources. Using its wireless scanner 314, the mobile device 104 periodically scans for ambient IWS sources. The tracker 320 detects, identifies, and records encountered ambient IWS sources of a present route.

Each detected and identified ambient IWS source is tracked as a series of such sources. If the series has differing ambient IWS sources, then the mobile device 104 is traveling. The pattern of differing ambient IWS sources may be a route. As used herein, the route has a start and end place as well as a set of ambient IWS sources that have been previously encountered along the route. Examples of such routes are illustrated in route datasets 212, 214, 222, and 224.

At 604, the route estimator 324 of the mobile device 104 attempts to recognize the present route. The results of this recognition attempt may result in one of several determinations:

The mobile device 104 is either in place $P_i$ or traveling a route in a set $\{R_1, R_2, \ldots R_n\}$;

The mobile device 104 is stationary and located in a known place $P_i$;

The mobile device 104 is traveling route in set $\{R_1, R_2, \ldots R_n\}$;

The mobile device 104 is in an unknown place; or

The mobile device 104 is traveling an unknown route.

These determinations may also be called user "states." Using the route information learned from past travels (which is stored in the memory 310), the route estimator 324 can recognize when a route is being traveled and predict the destination and ETA.

At 609, the route estimator 324 updates a "confidence" level with each of one or more known routes (e.g., previously recognized routes). Those routes are those recognized by, for example, process 500. This is an evidence-based confidence adjustment. That is, the degree of confidence adjustment for a given route or place depends upon how much evidence found in the one or more portions of the encountered series of ambient IWS sources.

In effect, with each ambient IWS source encountered, the mobile device 104 obtains evidence to adjust the confidence level with one or more of the previously known places/locations or routes. If the encountered ambient IWS source matches a known route or place, the confidence in the matching route or place increases. The amount of the confidence increase depends on the user's recent history. For example, if the user has recently departed place, such as Home 110, the observations of encountered ambient IWS sources in routes with a start of Home will increase confidence more than those that do not.

Similarly, if a user's state contains routes with the destination, such as Work 122, the observations of encountered ambient IWS sources from Work itself will cause confidence of our arrival at Work to rise quickly.

At 608, the route estimator 324 determines which of one or more known routes mostly likely matches the present route. In the absence of any ambient IWS source matches during the recognition operation 604, the confidence in all known routes and places decreases. If this continues, the user's state will ultimately settle on "unknown place" or "unknown route" based on the stability of the Wi-Fi signals. Evidence for routes and evidence for places is processed in concurrently or at least nearly so since a particular ambient IWS source can be part of a place and one or more routes (e.g., the restaurant 128 on the way Home 110 and to the café 124). The amount of the confidence increase is based on the user's history as represented by their place and route graph.

Confidence in routes or places that are predicted by the model increases at a faster rate than confidence in places or routes that are not predicted by the model. For example, if the user is on a route from Home 110 to the café 124, and the device 104 observes an ambient IWS source associated with the café 124, confidence in the place café increases quickly. On the other hand, if the device 104 observes an ambient IWS source associated with place Church 120 and we were not on the route to Church, confidence in place Church increases slowly.

The route estimator 324 determines which routes or places are most likely matches when their confidence level rises above a designated or calculated confidence threshold. Those that drop below a threshold are removed from consideration. These thresholds may be assigned based upon user state. Of course, the user can be in at most one place at a time. So, if a place rises above the threshold for state inclusion, any other place is immediately removed.

At 610, the route estimator 324 calculates an estimated time of arrival (ETA) based upon the determined route, which is the route with the highest degree of confidence. Similarly, the destination is predicted.

At 612, the action trigger 329 may trigger or perform an action based upon the determined route. The user may have configured the mobile device to perform an action at a certain place or based upon the ETA of a given route. For example, when a user leaves Work 122 and starts Home 110, the mobile device might send a message to her husband once the route from Work to Home is determined. That message may actually include a calculated ETA.

In some implementations, ambient IWS sources that are considered close to a known place may be ignored. For example, the ambient IWS source of the next-door neighbor may be culled from the route datasets involving the Home 110 so that they do not cause a false conclusion that the user is starting down a route when she is in fact staying at the place.

Also, in the case that a route and its reverse (Home->Work and Work->Home) are both above the threshold for inclusion in the user's state, the process 600 only include the one with higher confidence. This occurs because both routes will share many common ambient IWS sources.

Further, in some implementations, progress within a route is estimated by seeing how far into past trips the matching ambient IWS sources were encountered. For example, an ambient IWS source might match both of the current routes, P1->P5 and P1->P8, in the user's set, one usually encountered 25% of the way through the trip, the other 80%. The process 600 may estimate that the user is either 25% of the way to P5 or 80% of the way to P5. By scaling this estimate by the average trip time, the process may then make an estimate of ETA.

With some implementations, the mobile device 104 stores route durations as an average time. Things like traffic and mode of transportation (e.g., drive vs. bike) make it likely that trip durations will not fit a nice unimodal distribution. Maintaining estimated route duration as something more expressive like a sampled distribution or a set of Gaussians would allow accurate ETA prediction in the face of these factors.

A user's routes and places as well as the Wi-Fi infrastructure will change over time. To accommodate for this, some implementation may aging out training data over time. This could be accomplished in, for example, two ways: One is to occasionally retraining from scratch using only recent (e.g., within the last six months) Wi-Fi traces. Alternately, a 'time to live' field could be used to the route and place data allowing incremental aging of the training data.

Coverage-Hole Detection Operation

Figure 7:
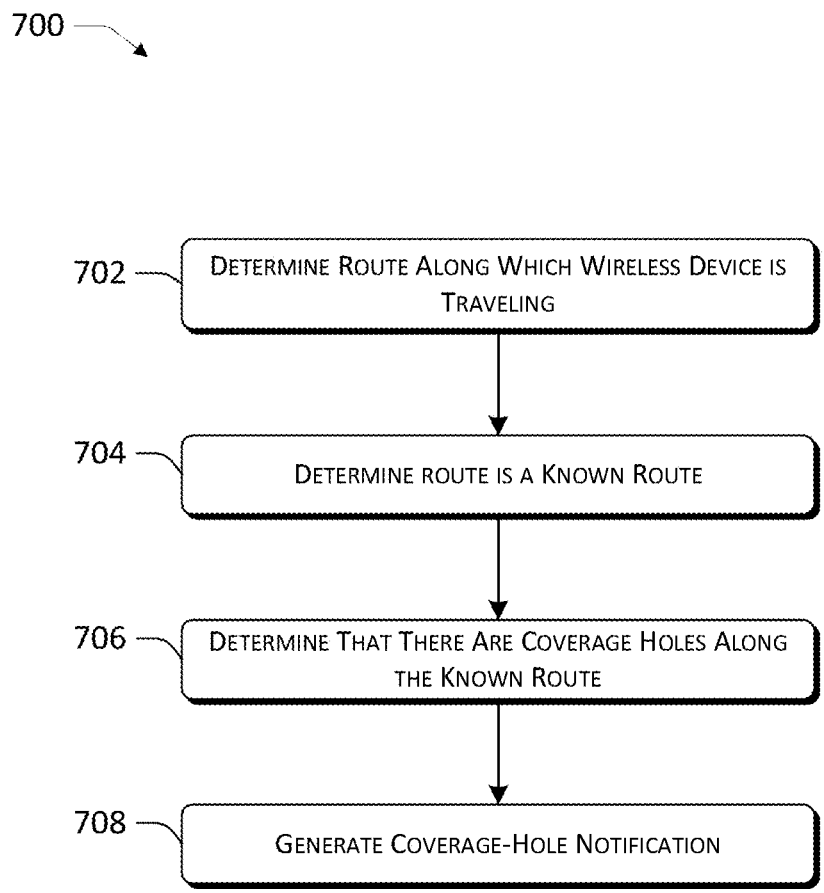

FIG. 7 illustrates an example process 700 for implementing, at least in part, the technology described herein. In particular, process 700 depicts a coverage-hole detection and notification operation of the mobile device 104. This process 700 may be operating at all times and thus can notify the user of potential upcoming dropped calls at all times.

At 702, the process 700 determines a route along which a mobile device is traveling. In one or more implementations, to determine the route the scanning module 402 encounters a series of ambient IWS sources while the mobile device 104 is traveling along a route.

At 704, the process 700 determines that the route that the mobile device is traveling along is a known route. In one or more implementations, to determine that the route is a known route the process 700 consults the database 410 looking for learned routes.

At 706, the process 700 determines that there are coverage holes along the known route. In one or more implementations, the process 700 consults the database 410, which stores a history of calls that were dropped along routes. The call-monitoring module 412 monitors routes along which the mobile device is traveling. The call-monitoring module 412 also compares the route along which the mobile device 104 is traveling to the learned routes that are stored in the database 410. The call-monitoring module 412 also compares the route along which the mobile device 104 is traveling to the history of dropped calls along the route.

At 708, the process 700 generates a coverage-hole notification. In one or more implementations, the notification module 414 generates a coverage-hole notification if the comparison of the route along which the mobile device 104 is traveling matches a stored, learned route that has a history of dropped calls. For instance, the notification module 414 plays an audible sound indicating that the route that the mobile device 104 is traveling along has a history of dropped calls.

In an alternative implementation, the notification module 414 displays a text message indicating that the route that the mobile device 104 is traveling along has a history of dropped calls. In still another alternative implementation, the notification module 414 displays a predetermined text message. The predetermined text message indicates that the route that the mobile device 104 is traveling along has a history of dropped calls and that the mobile device 104 should take an alternative route.

Figure 8:
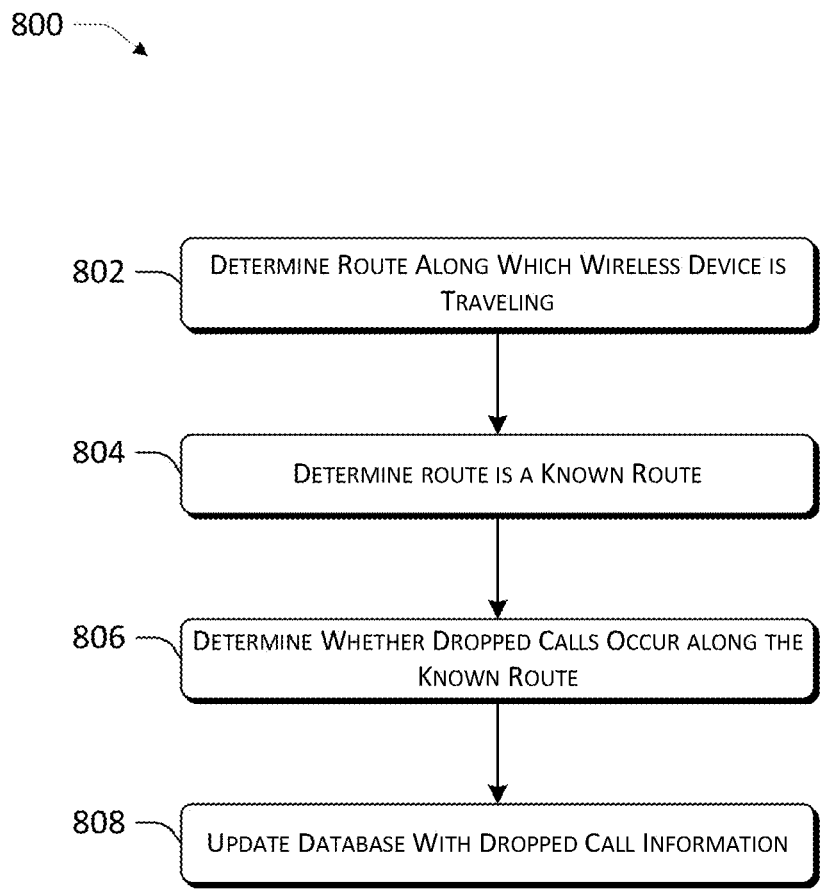

FIG. 8 illustrates an example process 800 for implementing, at least in part, the technology described herein. In particular, process 800 depicts a coverage-hole detection operation of the mobile device 104. This process 800 may be operating at all times and thus can update the database 410 of upon discovery of new dropped calls at all times.

At 802, the process 800 determines a route along which the mobile device 104 is traveling. In one or more implementations, the scanning module 402 encounters a series of ambient IWS sources while the mobile device 104 is traveling along a route. Then the tracking module 404 tracks the encountered series of ambient IWS sources along the route taken by the mobile device 104.

At 804, the process 800 determines that the route that the mobile device 104 is traveling along is a known route. In one or more implementations, to determine that the route is a known route the process 800 consults the database 410 looking for learned routes.

At 806, the process 800 determines whether any dropped calls occur along the known route. In one or more implementations, the learning module 408 determines that the route taken by the mobile device 104 includes any dropped calls and/or a pattern of dropped calls, caused by coverage holes, for example.

At 808, the process 800 updates the database 410 with the dropped-call information.

Figure 9:
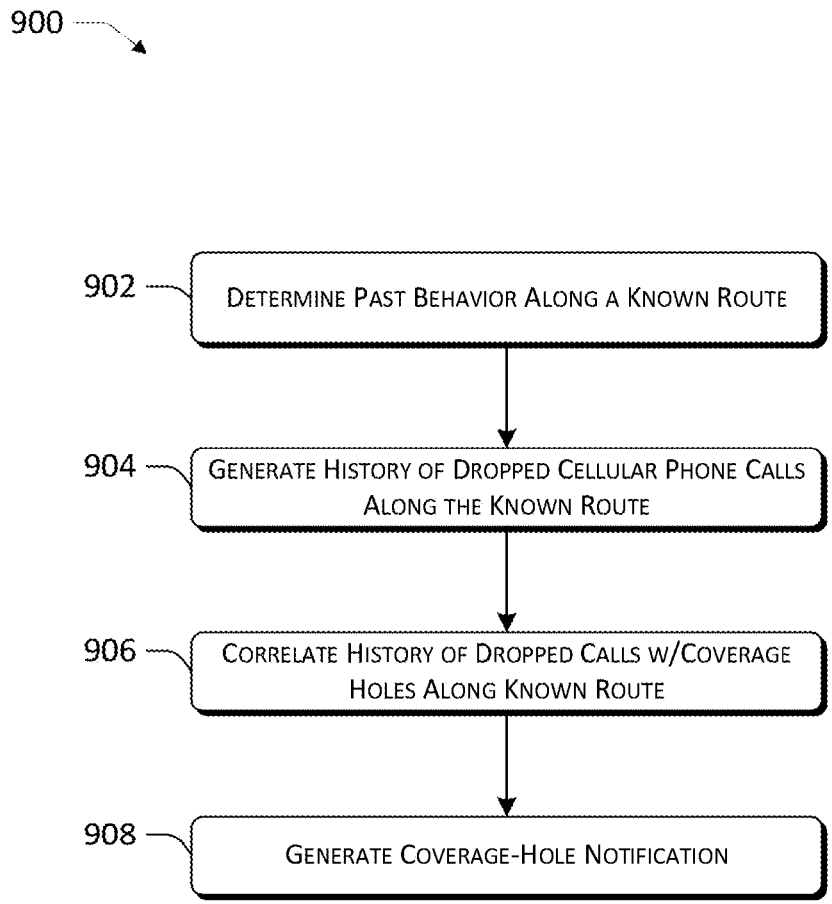

FIG. 9 illustrates an example process 900 for implementing, at least in part, the technology described herein. In particular, process 900 depicts an alternative coverage-hole detection and notification operation of the mobile device 104. This process 900 may be operating at all times and thus can notify the user of potential upcoming dropped calls at all times.

At 902, the process 900 determines past behavior along a known route that a mobile device is traveling. In one or more implementations, the process 900 consults the route database 350, which may be, at least in part, crowd-sourced. Additionally, based upon the collection of route datasets in the route database 350, the route-learning assistant 342 helps individual devices learn new, unknown, unrecognized, or incomplete routes. The database 350 may be consulted for cross-referencing ambient IWS sources and routes traveled by various mobile devices.

At 904, the process 900 generates a history of dropped cellular phone calls along a known route. This may be accomplished by observing past behavior along the known route that the mobile device is traveling, by crowd-sourcing, or other suitable method. In one or more implementations, the learning module 406 provides the history of dropped cellular phone calls along a known route, by observing past behavior along the known route At 906, the process 900 correlates the history of dropped calls with coverage holes found along the known route. In one or more implementations, the learning module 406 correlates the history of dropped calls with coverage holes.

At 909, the process 900 generates coverage-hole notifications, like those described above with regard to operation 808.

Example Computing Device

Figure 10:
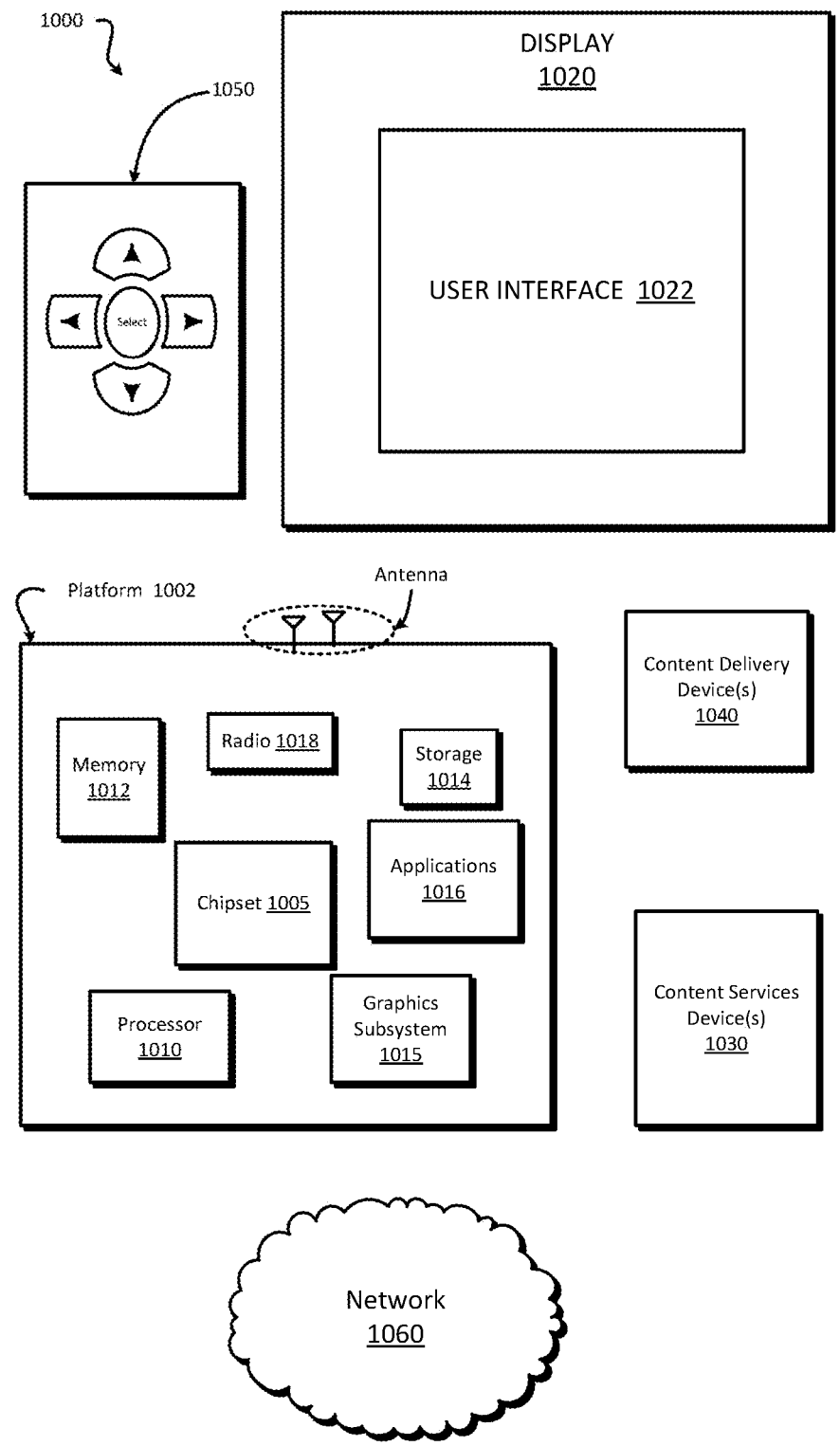
FIG. 10 illustrates an example computing device to implement in accordance with the technologies described herein.

FIG. 10 illustrates an example system 1000 that may implement, at least in part, the technologies described herein. In various implementations, system 1000 may be a media system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, storage 1014, graphics subsystem 1015, applications 10110 and/or radio 10110. Chipset 1005 may provide intercommunication among processor 1010, memory 1012, storage 1014, graphics subsystem 1015, applications 10110 and/or radio 10110. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x106 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, Display Port, wireless HDMI, and/or wireless HD compliant techniques. Graphics subsystem 1015 may be integrated into processor 1010 or chipset 1005. In some implementations, graphics subsystem 1015 may be a stand-alone card communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general-purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. In addition, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 10100 to communicate (e.g., send and/or receive) media information to and from network 10100. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of unidirectionally or bidirectionally communicating content between content providers and platform 1002 and/display 1020, via network 1060 or directly. It will be appreciated that the content may be communicated unidirectionally and/or bidirectionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of controller 1050 may be used to interact with user interface 1022, for example. In embodiments, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In embodiments, controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

As described above, system 1000 may be embodied in varying physical styles or form factors. FIG. 10 illustrates implementations of a small form factor device 1000 in which system 1000 may be embodied. In embodiments, for example, device 1000 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Figure 11:
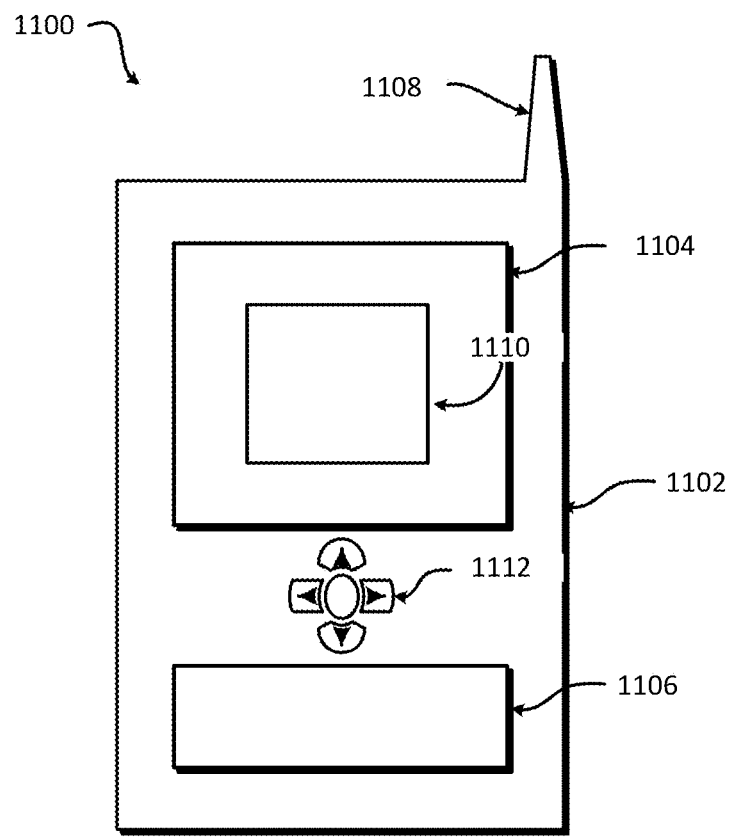
FIG. 11 illustrates an example device to implement in accordance with the technologies described herein.

As shown in FIG. 11, device 1100 may include a housing 1102, a display 1104, an input/output (I/O) device 1106, and an antenna 1108. Device 1100 also may include navigation features 1112. Display 1104 may include any suitable display unit for displaying information appropriate for a mobile computing device. I/O device 1106 may include any suitable I/O device for entering information into a mobile computing device. Examples for I/O device 1106 may include an alphanumeric keyboard, a numeric keypad, a touch pad, input keys, buttons, switches, rocker switches, microphones, speakers, voice recognition device and software, and so forth. Information also may be entered into device 1100 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

Additional And Alternative Implementation Notes

In general, a mobile device is a small, hand-held, portable computing device that typically has a display screen and some user input mechanism (e.g., touch screen or keyboard). Often they weigh less than two pounds. Often, they are equipped with wireless communications capabilities, such as WiFi, Bluetooth, and cellular. Examples of implementations of a mobile device include a smartphone, a tablet computer, a feature phone, a personal digital assistant (PDA), any wireless-enabled wearable devices, laptop computers, netbook computers, or other so-called handheld devices or computers.

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventor intends the described exemplary implementations to be primarily examples. The inventor does not intend these exemplary implementations to limit the scope of the appended claims. Rather, the inventor has contemplated that the claimed invention might also be embodied and implemented in other ways, in conjunction with other present or future technologies.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts and techniques in a concrete fashion. The term "technology," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

These processes are illustrated as a collection of blocks in a logical flow graph, which represents a sequence of operations that can be implemented in mechanics alone or a combination with hardware, software, and/or firmware. In the context of software/firmware, the execution of the instructions on the medium may cause performance of the operations described herein.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

The term "computer-readable media" includes computer-storage media. For example, computer-storage media may include, but are not limited to, magnetic storage devices (e.g., hard disk, floppy disk, and magnetic strips), optical disks (e.g., compact disk [CD] and digital versatile disk [DVD]), smart cards, flash memory devices (e.g., thumb drive, stick, key drive, and SD cards), and volatile and nonvolatile memory (e.g., random access memory [RAM], read-only memory [ROM]).

What is claimed is:

1. A mobile device comprising:
a scanner that is configured to encounter a series of ambient wireless access points (WAPs) while the mobile device is traveling along a present route;
a tracker that is configured to determine whether the present route that the mobile device is traveling along is not a known route and in response to a determination that the present route that the mobile device is traveling along is not a known route, then the tracking module is further configured to track the encountered series of ambient WAPs along the present route taken by the mobile device;
route estimator that is configured to determine whether the present route that the mobile device is traveling along is a known route that includes dropped calls and in response to a determination that the present route that the mobile device is traveling along is a known route, the determining whether there are one or more cellular-phone coverage holes along the known route;
a cellular-phone call monitor that is configured to monitor the present route along which the mobile device is traveling and to match the present route along which the mobile device is traveling to the known route with one or more cellular-phone coverage holes; and
a notifier that is configured to generate a cellular-phone coverage-hole notification when the mobile device traveling along the present route approaches a cellular-phone coverage hole of the matched known route.

2. A mobile device according to claim 1 wherein the notifier is further configured to play an audible sound indicating that the present route along which the mobile device is traveling matches a known route with one or more cellular-phone coverage holes.

3. A mobile device according to claim 1 wherein the notifier is further configured to display a text message indicating that the present route along which the mobile device is traveling matches a known route with one or more cellular-phone coverage holes.

4. A mobile device according to claim 1 wherein the notifier is further configured to display a predetermined message indicating that the present route along which the mobile device is traveling matches a known route with one or more cellular-phone coverage holes and that the mobile device should take an alternative route.

5. A mobile device according to claim 1 further comprising a database configured to indicate that the present route that the mobile device is traveling along is a known route.

6. A mobile device according to claim 1 further comprising a database configured to indicate that the present route that the mobile device is traveling along is a known route with one or more cellular-phone coverage holes.

7. A mobile device according to claim 1 wherein the database is further configured to store known routes with a history of cellular-phone dropped calls along the known route based on crowd-sourced past behavior.

8. A mobile device according to claim 1 wherein the database is further configured to store known routes with a history of cellular-phone dropped calls along the known route based on past behavior of the mobile device.

9. One or more non-transitory computer-readable media storing processor-executable instructions that when executed cause one or more processors to perform a method comprising:
- determining a route based upon an encountered series of ambient wireless access points (WAPs) while the mobile device is traveling;
- determining whether the route that the mobile device is traveling along is a known route;
- in response to determining that the route that the mobile device is traveling along is a known route, determining whether there are one or more cellular-phone coverage holes along the known route;
- in response to determining that the route that the mobile device is traveling along is not a known route, tracking the series of ambient WAPs while the mobile device is traveling along the route; and
- in response to determining that there are one or more cellular-phone coverage holes along the known route, generating a coverage-hole notification indicating that there are one or more cellular-phone coverage holes along the route.

10. One or more non-transitory computer-readable media according to claim 9 wherein determining whether there are one or more cellular-phone coverage holes along the known route includes determining that there have been one or more dropped cellular phone calls along the known route.

11. One or more non-transitory computer-readable media according to claim 9 wherein determining whether there are one or more cellular-phone coverage holes along the known route includes:
- determining a past behavior along the known route;
- in response to determining the past behavior, generating a history of one or more dropped cellular phone calls along the known route; and
- correlating the history of the one or more dropped cellular phone calls along the known route to the one or more coverage holes along the known route.

12. One or more non-transitory computer-readable media according to claim 9 wherein generating a history of one or more dropped cellular phone calls along the known route includes obtaining past behaviors along the known route or obtaining crowd-sourced past behaviors.

13. One or more non-transitory computer-readable media according to claim 9 wherein the coverage-hole notification is generated while the mobile device is traveling along the known route or at a predetermined time before mobile device encounters the one or more coverage holes.

14. One or more non-transitory computer-readable media according to claim 9 wherein generating the coverage-hole notification includes actions selected from a group consisting of:
- playing an audible sound indicating that there are one or more coverage holes along the known route;
- displaying a text message indicating that there are one or more coverage holes along the known route; and
- displaying a predetermined message indicating an alternative known route.

15. One or more non-transitory computer-readable media according to claim 9, further comprising, in response to tracking the series of ambient WAPs while the mobile device is traveling along the route, creating a new known route.

16. One or more non-transitory computer-readable media according to claim 9, further comprising, in response to tracking the series of ambient WAPs while the mobile device is traveling along the route, creating a new known route, further comprising, in response to creating a new known route, monitoring the new known route for mobile device coverage holes.

17. One or more non-transitory computer-readable media according to claim 9, further comprising, in response to tracking the series of ambient WAPs while the mobile device is traveling along the route, creating a new known route, further comprising, in response to creating a new known route, monitoring the new known route for mobile device coverage holes further comprising, in response to monitoring the new known route for mobile device coverage holes, storing locations of mobile device coverage holes in a database.

18. One or more non-transitory computer-readable media according to claim 9 wherein determining whether there are one or more coverage holes along the known route includes determining that a cellular-phone signal level of the mobile device is below a predetermined signal level.

19. One or more non-transitory computer-readable media according to claim 9 wherein determining whether there are one or more coverage holes along the known route includes determining that a dropped cellular-phone call has been experienced in a place along the route.

20. One or more non-transitory computer-readable media according to claim 9, further comprising:
- determining that the mobile device has arrived at a destination; and
- in response to that determination, updating one or more known routes with information obtained regarding the route along which the mobile device is traveling.

21. One or more non-transitory computer-readable media storing processor-executable instructions that when executed cause one or more processors to perform a method comprising:
- encountering a series of ambient wireless access points (WAPs) while the mobile device is traveling along a present route;
- recognizing the present route based upon at least a portion of the series of encountered ambient WAPs;
- based upon the recognizing, determining whether one of multiple known routes most likely matches the present route;
- in response to determining that none of the multiple known routes most likely matches the present route, tracking the series of ambient WAPs while the mobile device is traveling along the route
- in response to determining that at least one of the multiple known routes most likely matches the present route, selecting the determined known route as a match to the present route of mobile device travel;
- based upon the selecting, determining whether the known route includes a history of one or more dropped cellular-phone calls; and
- based upon a determination that the known route includes a history of dropped cellular-phone calls, generating a cellular-phone coverage-hole notification that the known route includes a history of dropped calls.

22. One or more non-transitory computer-readable media according to claim 21, wherein generating the coverage-hole notification includes actions selected from a group consisting of:
- playing an audible sound indicating that the known route includes a history of dropped calls; and
- displaying a text message that the known route includes a history of dropped calls.

23. One or more non-transitory computer-readable media according to claim 21, wherein generating a coverage-hole notification that the known route includes a history of dropped calls includes displaying a predetermined message indicating an alternative known route.

24. One or more non-transitory computer-readable media according to claim 21, further comprising:
determining that the mobile device has arrived at a destination; and
in response to that determination, updating the one or more known routes with information obtained regarding the present route.

25. One or more non-transitory computer-readable media according to claim 21, wherein determining whether the known route includes a history of one or more dropped calls includes determining that there have been one or more dropped cellular phone calls along the known route.

26. One or more non-transitory computer-readable media according to claim 21, wherein determining whether the known route includes a history of one or more dropped cellular-phone calls includes:
determining a past behavior along the known route;
in response to determining the past behavior, generating a history of one or more dropped cellular phone calls along the known route; and
correlating the history of the one or more dropped cellular phone calls along the known route to the one or more coverage holes along the known route.

27. One or more non-transitory computer-readable media according to claim 26, wherein generating a history of one or more dropped cellular phone calls along the known route includes obtaining crowd-sourced past behaviors.

28. One or more non-transitory computer-readable media according to claim 26, wherein generating a history of one or more dropped cellular phone calls along the known route includes obtaining past behaviors along the known route.

29. One or more non-transitory computer-readable media according to claim 21, wherein recognizing the present includes comparing the portion of the series of encountered ambient WAPs with the one or more known routes.

30. One or more non-transitory computer-readable media according to claim 21, wherein, based upon the selecting, determining that the known route lacks a history of dropped cellular phone calls.

31. One or more non-transitory computer-readable media according to claim 21, wherein encountering the series of ambient WAPs includes:
detecting ambient WAPs of the series while the mobile device is traveling; and
identifying unique identifications of the detected ambient WAPs of the series.

32. A method comprising:
determining a present route based upon an encountered series of ambient wireless access points (WAPs) while the mobile device is traveling;
determining whether the present route that the mobile device is traveling along is a known route, the determining being based, at least in part, upon one or more of the encountered series of WAPs;
in response to determining that the present route that the mobile device is traveling along is a known route, tracking the series of ambient WAPs while the mobile device is traveling along the route;
in response to determining that the present route that the mobile device is traveling along is a known route, determining whether there are one or more cellular-phone coverage holes along the known route; and
in response to determining that there are one or more cellular-phone coverage holes along the known route, generating a coverage-hole notification indicating that there are one or more cellular-phone coverage holes along the present route.

33. A method according to claim 32 wherein determining whether there are one or more coverage holes along the known route includes determining that there have been one or more dropped cellular phone calls along the known route.

34. A method according to claim 32 wherein determining whether there are one or more coverage holes along the known route includes:
determining a past behavior along the known route;
in response to determining the past behavior, generating a history of one or more dropped cellular phone calls along the known route; and
correlating the history of the one or more dropped cellular phone calls along the known route to the one or more coverage holes along the known route.

35. A method according to claim 32 wherein generating a history of one or more dropped cellular phone calls along the known route includes obtaining crowd-sourced past behaviors or obtaining past behaviors of the mobile device along the known route.

36. A method according to claim 32 wherein the coverage-hole notification is generated while the mobile device is traveling along the known route or at a predetermined time before mobile device encounters the one or more coverage holes.

37. A method according to claim 32 wherein generating the coverage-hole notification includes an action selected from a group consisting of:
playing an audible sound indicating that there are one or more coverage holes along the known route;
displaying a text message indicating that there are one or more coverage holes along the known route; and
displaying a predetermined message indicating an alternative known route.

* * * * *